US006644910B2

(12) United States Patent
Gotz

(10) Patent No.: US 6,644,910 B2

(45) Date of Patent: Nov. 11, 2003

(54) FORK LIFT TRUCK WITH ELASTIC BEARING

(75) Inventor: Bernhard Gotz, Aschaffenburg (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/875,278

(22) Filed: Jun. 6, 2001

(65) Prior Publication Data

US 2002/0003998 A1 Jan. 10, 2002

(30) Foreign Application Priority Data

Jun. 16, 2000 (DE) ........................................ 100 29 881

(51) Int. Cl.[7] .............................. B65G 9/00; B66F 9/00

(52) U.S. Cl. ...................................................... 414/635

(58) Field of Search ................................ 414/634, 635, 414/914, 630, 631, 632, 633, 636, 637; 384/907, 909; 187/222

(56) References Cited

U.S. PATENT DOCUMENTS 3,321,044 A * 5/1967 Linsay ................... 414/635 X
4,067,393 A * 1/1978 Szarkowski ............. 414/635 X
5,152,658 A * 10/1992 Martin ....................... 414/635
5,224,815 A * 7/1993 Abels et al. ................ 414/635

FOREIGN PATENT DOCUMENTS

DE 198 49 770 A1 5/2000
JP 401271399 * 10/1989 ................. 414/785

* cited by examiner

*Primary Examiner*—Christopher P. Ellis
*Assistant Examiner*—Richard Ridley
(74) *Attorney, Agent, or Firm*—Webb Ziesenheim Logsdon Orkin & Hanson, P.C.

(57) ABSTRACT

A fork lift truck is provided having a vehicle frame (1) and a lifting mechanism (6). An axle body (3) of a front axle of the fork lift truck is fastened to the vehicle frame (1) by at least one elastic bearing. The lifting mechanism (6) is connected with the axle body (3) by a non-elastic bearing or by a rigid connecting element. The elastic bearing is configured such that a relative movement that takes place in the event of a tilting of the lifting mechanism (6) between the axle body (3) and the vehicle frame (1) can be equalized by the elastic bearing.

12 Claims, 5 Drawing Sheets

FORK LIFT TRUCK WITH ELASTIC BEARING

CROSS-REFERENCE TO RELATED APPLICATION

This application claims priority to German Application No. 100 29 881.8, filed Jun. 16, 2000, which is herein incorporated by reference in its entirety.

BACKGROUND OF THE INVENTION

1. Field of the Invention

This invention relates to a fork lift truck having a vehicle frame and lifting mechanism, with an axle body of a front axle of the fork lift fastened to the vehicle frame by at least one elastic bearing.

2. Technical Considerations

A fork lift truck with an axle body elastically connected to the vehicle frame is disclosed in DE 198 49 770 A1, herein incorporated by reference. The elastic bearing formed by an elastomeric damping element prevents the transmission of vibrations that occur in the vicinity of the axle body to the vehicle frame. In this system, there is an additional elastic bearing that connects the lifting mechanism with the axle body, as a result of which these two components are vibrationally isolated. A tilting of the lifting mechanism is also possible as a result of the elastic deformation of the additional elastic bearing. This system has the disadvantage that the elastic bearing system can lead to lateral oscillations or vibrations of the lifting mechanism and, hence, to instability of the lifting mechanism during normal operation.

Therefore, it is an object of the invention to provide a fork lift truck that has a lifting mechanism that is vibrationally isolated from the vehicle frame, and on which sufficient lateral stability of the lifting mechanism is provided.

SUMMARY OF THE INVENTION

The invention provides a vehicle in which the lifting mechanism is connected to an axle body by a non-elastic bearing or by a rigid connecting element. Thus, the lifting mechanism cannot be displaced or inclined in a lateral direction with respect to the axle body. Vibrational isolation of the lifting mechanism from the vehicle frame is provided by the elastic bearing system of the axle body on the vehicle frame. The rigid connecting element can be configured, for example, as a threaded connection or a welded connection. When the lifting mechanism is fastened to the axle body by a non-elastic bearing, for example, by a metal friction bearing, the lifting mechanism can be pivoted with respect to the axle body around an axis that runs parallel to the axle body, which corresponds to the conventional fastening system of a lifting mechanism.

There are additional advantages if the lifting mechanism is connected to the axle body by a rigid connecting element and the lifting mechanism can be inclined together with the axle body relative to the vehicle frame. When the lifting mechanism is inclined around an axis that runs parallel to the axle body, the axle body is moved along with the lifting mechanism. The lifting mechanism can be inclined around the center axis of the axle body so that the axle body does not thereby experience much, if any, translational change in position.

The elastic bearing is preferably configured so that the relative movement that occurs between the axle body and the vehicle frame during tilting of the lifting mechanism can be equalized by the elastic bearing. When the lifting mechanism tilts, there is an elastic deformation of the bearing between the axle body and the vehicle frame. There is little or no sliding movement between components, so that little or no friction-related wear occurs either. The arrangement with the rigid connection between the lifting mechanism and the axle body and with the elastic bearing between the axle body and the vehicle frame is also maintenance-free.

Each elastic bearing has at least one elastic, e.g., elastomeric, damping element. The elastic damping element prevents the transmission of oscillations and structure-borne noise between the axle body and the vehicle frame. The elastic deformability of the damping element also makes possible a slight rotation of the axle body with respect to the vehicle frame, of the type that occurs during the tilting of the lifting mechanism. Elastomeric damping elements can be conventionally manufactured easily in any desired shape and can be permanently connected with metal components using suitable conventional methods.

At least one drive unit for the traction drive of the fork lift truck can be fastened to the axle body. A hydraulic or electric wheel motor, for example, can be located on each end of the axle body. It is likewise possible to locate a mechanical drive train in the axle body. The vibrations generated by the drive unit are transmitted to the axle body, although as a result of the elastic bearing system, they are not transmitted into the vehicle frame.

Front wheels of the fork lift are also mounted on the axle body. The vibrations and impacts that occur when the truck travels over an uneven roadway are thus also transmitted to the axle body, but they are transmitted to the vehicle frame, if at all, only after they have been damped by the elastic damping element(s). In the system of the invention, the forces of gravity that act on the lifting mechanism are supported directly on the roadway via the axle body and the front wheels, i.e., these forces are not directed into the vehicle frame.

The horizontal distance between the front wheels and the lifting mechanism can be adjusted to desired requirements if the lifting mechanism is connected to the axle body in at least two positions. This type of adjustability can be made in a particularly simple manner with the use of a screw connection. For example, if the front wheels are to be provided with chains for traction in the snow, it may be necessary to increase the distance between the front wheels and the lifting mechanism.

In one advantageous embodiment of the invention, the axle body is formed by a tubular component. The tubular configuration makes it possible to achieve an equalized distribution of stresses in the axle body. Stress peaks and the resulting potential fatigue failures are thus avoided.

It is further advantageous if at least one ring-shaped axle clamp is connected with the vehicle frame, whereby at least one elastic, e.g., elastomeric, damping element is located between the axle body and each axle clamp. Preferably, a plurality of damping elements are distributed between the axle body and the axle clamp over the periphery. As a rule, there is one axle clamp on each side of the axle body connecting the axle body with the vehicle frame.

In one appropriate configuration of the invention, the axle body is made at least partly, and preferably in its entirety, of gray cast iron. The material gray cast iron has a high internal damping, so that vibrations that occur in the drive units are partly already damped by the axle body.

In one appropriate refinement of the invention, the lifting mechanism is connected to the axle body by a rigid connecting element and the lifting mechanism is connected to the vehicle frame by at least one support element that is at a distance from the axle body, such that a torque that is exerted on the axle body can be supported via the lifting mechanism and the support element on the vehicle frame. The lifting mechanism and the support element thus form a torque support for the axle body and the drive units, so that there is no need for a torque support in the form of a separate component. The torques that are exerted on the axle body during a braking process or during an acceleration process are thereby transmitted via the lifting mechanism and the support elements into the vehicle frame.

It is particularly advantageous if the support element is formed by at least one hydraulic tilting cylinder. By means of the tilting cylinder, the lifting mechanism can be tilted relative to the vehicle frame, whereby, as described above, the elastic damping elements are deformed. At the same time, the tilting cylinder(s) can be used to support the torques that are exerted on the axle body. If the tilting cylinder(s) are located on the top of the lifting mechanism, the result is a long lever arm, as a result of which the forces to be absorbed with the tilting cylinders can be minimized.

BRIEF DESCRIPTION OF THE DRAWINGS

Additional advantages and details of the invention are explained below with reference to the exemplary embodiments illustrated in the accompanying drawing figures, in which.

DESCRIPTION OF THE PREFERRED EMBODIMENT

Figure 1:
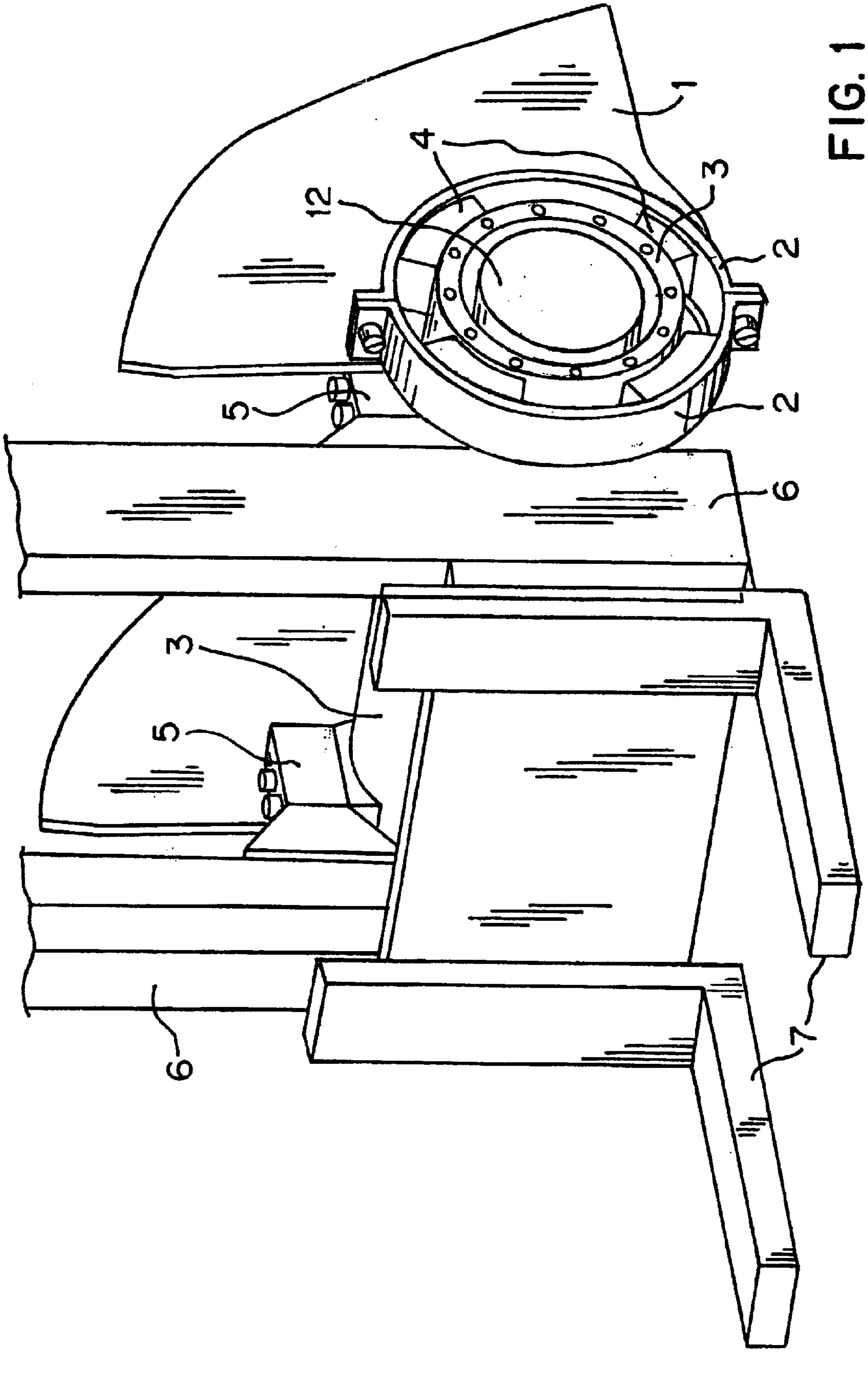
FIG. 1 is a perspective view of a front portion of a fork lift truck incorporating features of the invention.

FIG. 1 shows a perspective view of a front portion of a fork lift truck incorporating the features of the invention. The truck includes a vehicle frame 1 with an axle clamp 2 located on or connected to the frame 1. Coaxial with the axle clamp 2 there is a tubular axle body 3 that extends over the entire width of the fork lift truck. The axle body 3 is connected with the axle clamp 2 by an elastic bearing of the invention. The elastic bearing is formed by one or more elastic, e.g., elastomeric, damping elements 4 that are located between and/or that connect the axle body 3 with the axle clamp 2. The elastic damping elements 4 can be made of any suitable material, such as but not limited to, natural or synthetic elastic substances, e.g., rubber or neoprene. The axle body 3 is connected by one or more rigid, e.g., non-elastic, connecting elements 5 with a lifting mechanism 6, to which is connected a load fork 7 that can be moved in the vertical direction. At least one drive unit 12 for traction operation of the fork lift truck is fastened to the axle body 3. A hydraulic or electric wheel motor, for example, can be located at each end of the axle body 3.

Figure 2:
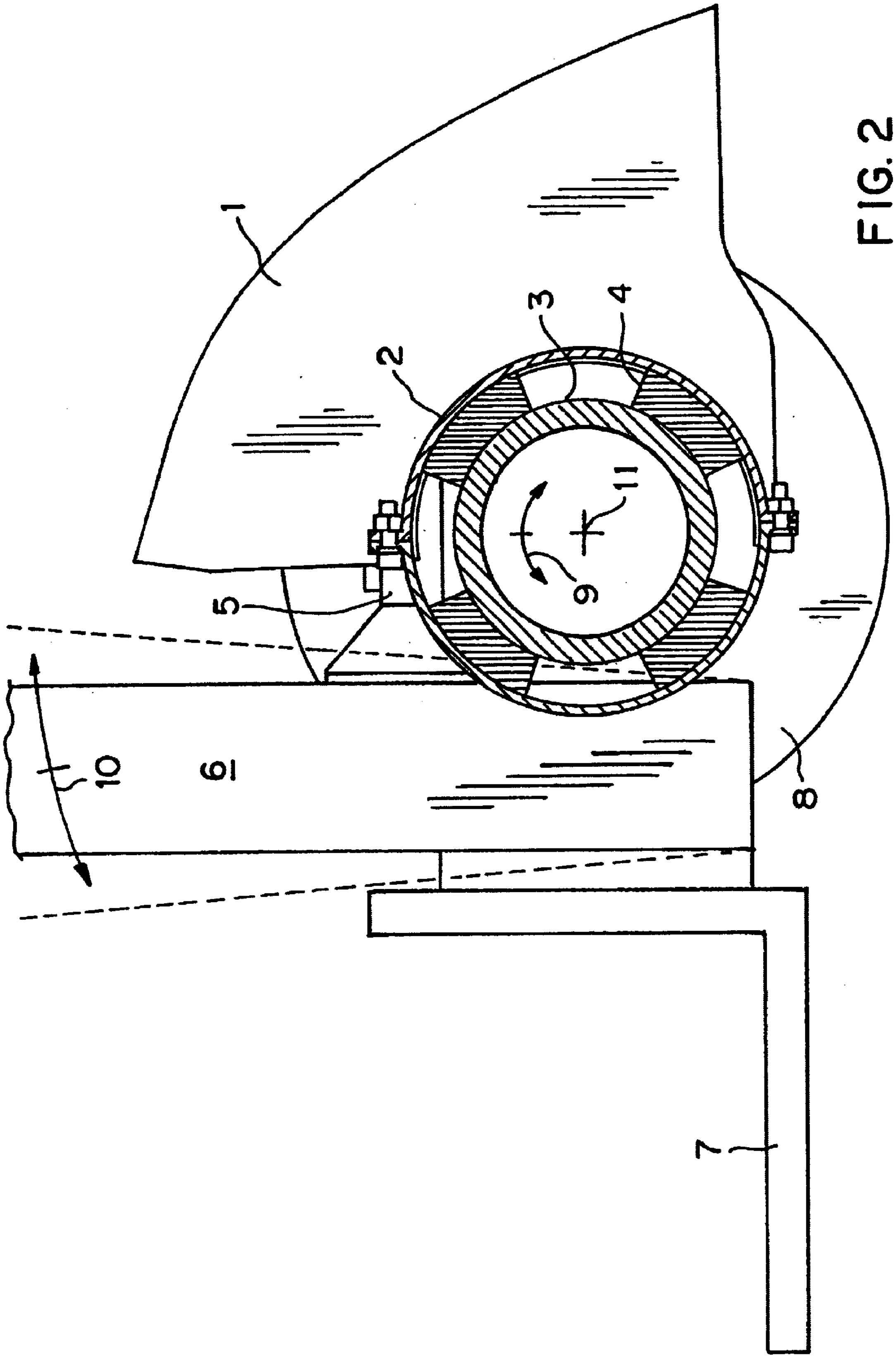
FIG. 2 is a side view of the truck of FIG. 1 showing the location of an elastic connecting element of the invention.

FIG. 2 shows the system illustrated in FIG. 1 in a side view, with the elastic bearing shown in more detail. The elastic damping elements 4 can be distributed uniformly or substantially uniformly over the periphery of the axle body 3. After installation, the damping elements 4 are biased, e.g., compressed, by the axle clamp 2. The damping elements 4 can be secured against slipping with respect to the axle clamp 2 and the axle body 3 by suitable shaping. For example, the damping elements 4 can be wedge-shaped with inner and outer curvatures corresponding to the curvatures of the axle body 3 and axle clamp 2, respectively, as shown in FIG. 2.

The mass forces that act on the lifting mechanism 6 are transmitted by the rigid connecting element 5 directly into the axle body 3 and, for the most part, are supported directly on the roadway via the front wheels 8 that are rotatably mounted on the axle body 3, e.g., by roller bearings. The forces that occur between the axle body 3 and the vehicle frame 1 are transmitted via the damping elements 4. As a result of which, impacts, vibrations, and noises are damped.

The elastic bearing system also makes possible movement of the axle body 3 relative to the vehicle frame 1 and the axle clamp 2 in the direction of the arrow 9. This mobility is used to make possible a tilting of the lifting mechanism 6 in the direction of the arrow 10 without the need for a conventional pivot bearing. When the lifting mechanism 6 tilts, only the elastic damping elements 4 are deformed. The tilting axis of the lifting mechanism 6 is thereby the center axis 11 of the axle body 3.

Figure 3:
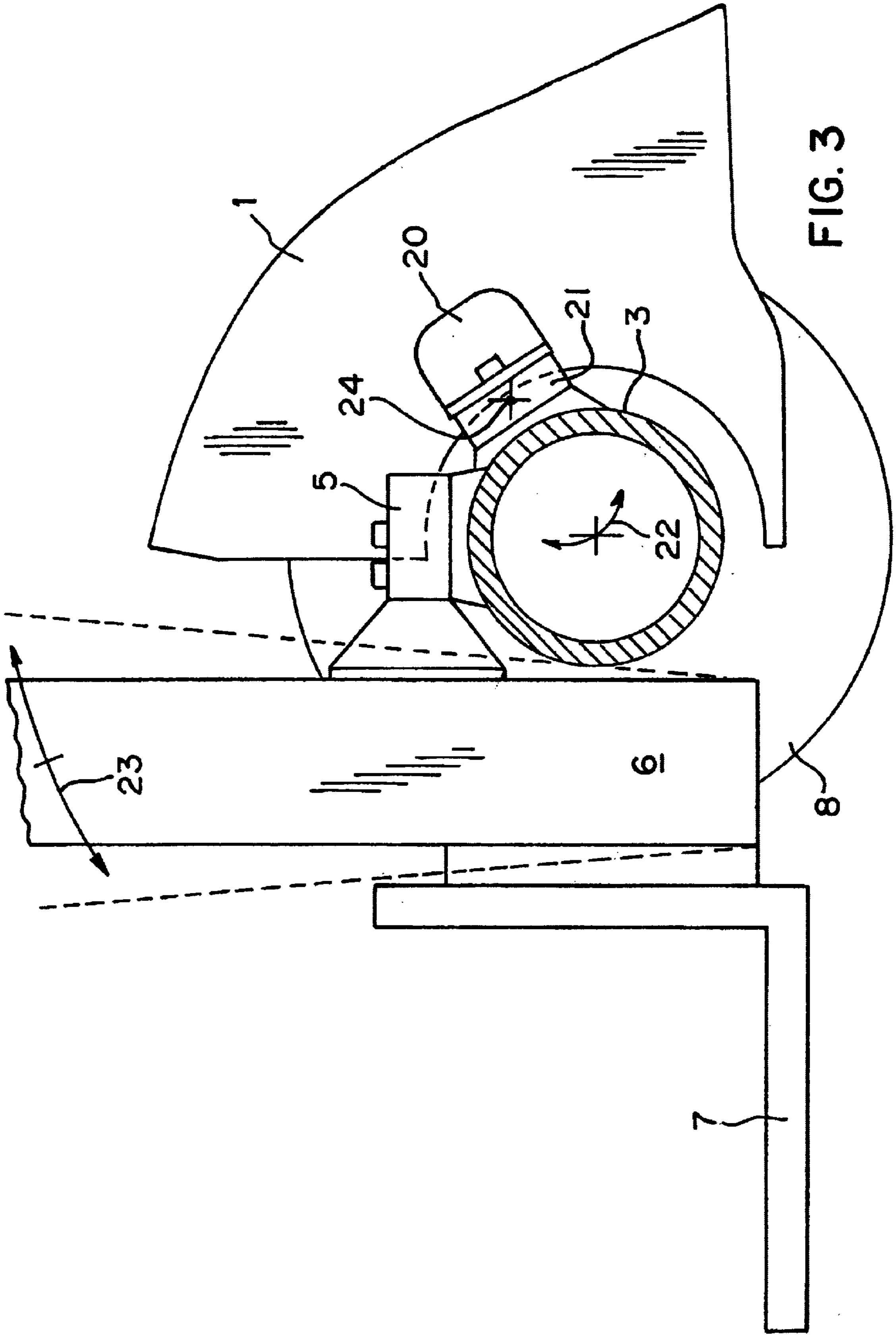
FIG. 3 is a side view of an additional exemplary embodiment of the elastic connecting element of the invention.

FIG. 3 shows a similar arrangement where, instead of the axle clamp 2 on the vehicle frame 1, there is a fastening body 20 for an elastic damping element 21, which is engaged on a location of the outer periphery of the axle body 3. The advantages achieved with regard to the transmission of forces from the lifting mechanism 6 to the front wheels 8 and with regard to the damping of vibrations and impacts are the same as in the arrangement illustrated in FIGS. 1 and 2. The damping element 21 is also capable of compensating for a tilting movement of the lifting mechanism 6 in the direction of the arrow 23. In this case, the lifting mechanism 6 is pivoted together with the axle body 3 in the direction of the arrow 22 around the center axis 24 of the damping element 21.

Figure 4:
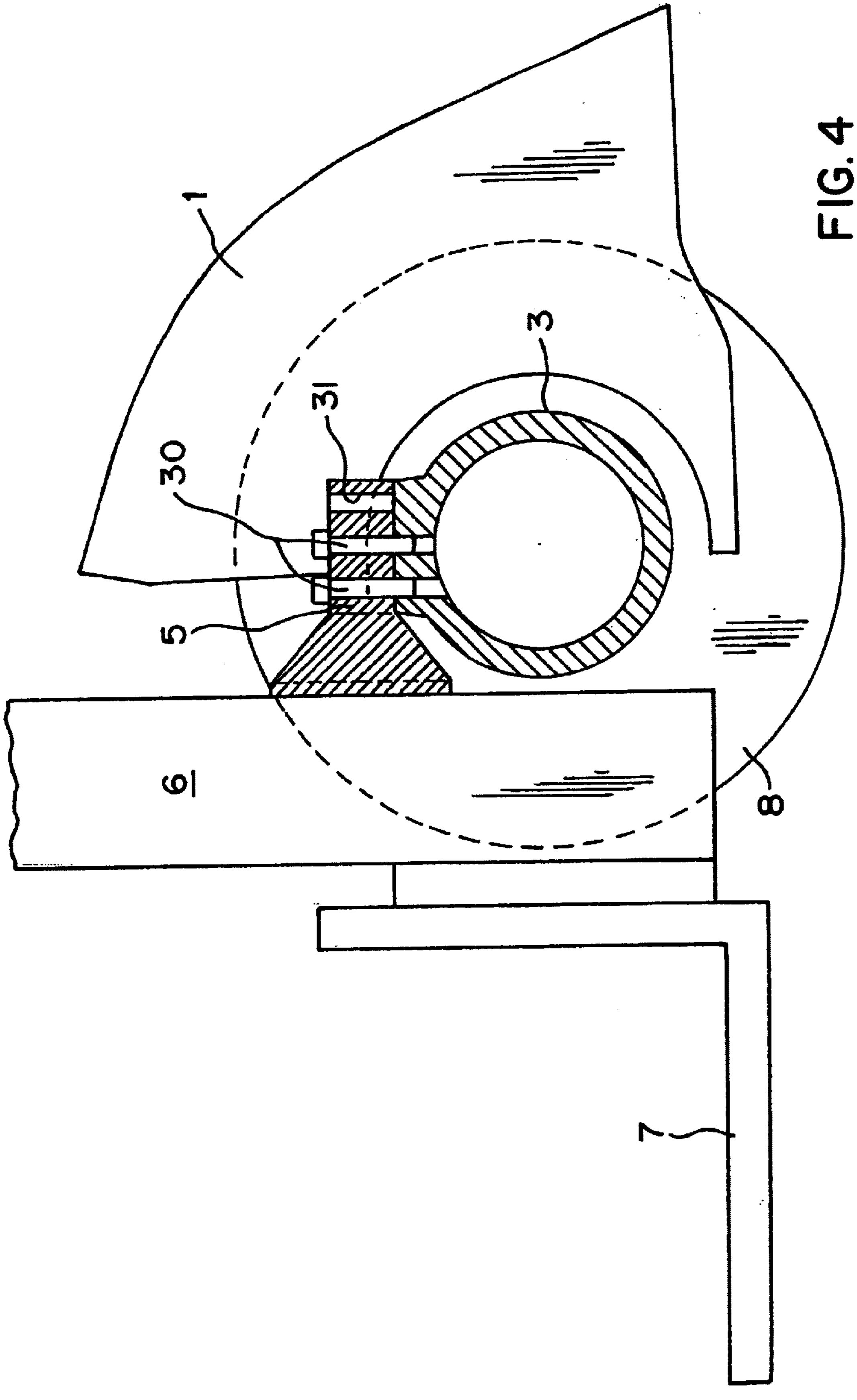
FIG. 4 is a side view of the truck of FIG. 1 showing a rigid connecting element between the axle body and lifting mechanism.

FIG. 4 shows an exemplary embodiment of the rigid connecting element 5 between the lifting mechanism 6 and the axle body 3. The connecting element 5 in this exemplary embodiment is not detachably fastened to the lifting mechanism 6, but is screwed to the axle body 3 by two screws 30 threadably engaging borings in the connecting element 5. If the front wheels 8 of the fork lift truck are to be equipped with chains, or if other, larger-diameter front wheels 8 are to be installed, the lifting mechanism 6 may need to be offset to the left with respect to the drawing figure. For this purpose, the connecting element 5 has one or more additional borings, e.g., a third boring 31, which makes possible an offset installation of the lifting mechanism 6, whereby this third boring 31 and the center boring shown in FIG. 4 are then used to hold the screws 30.

Figure 5:
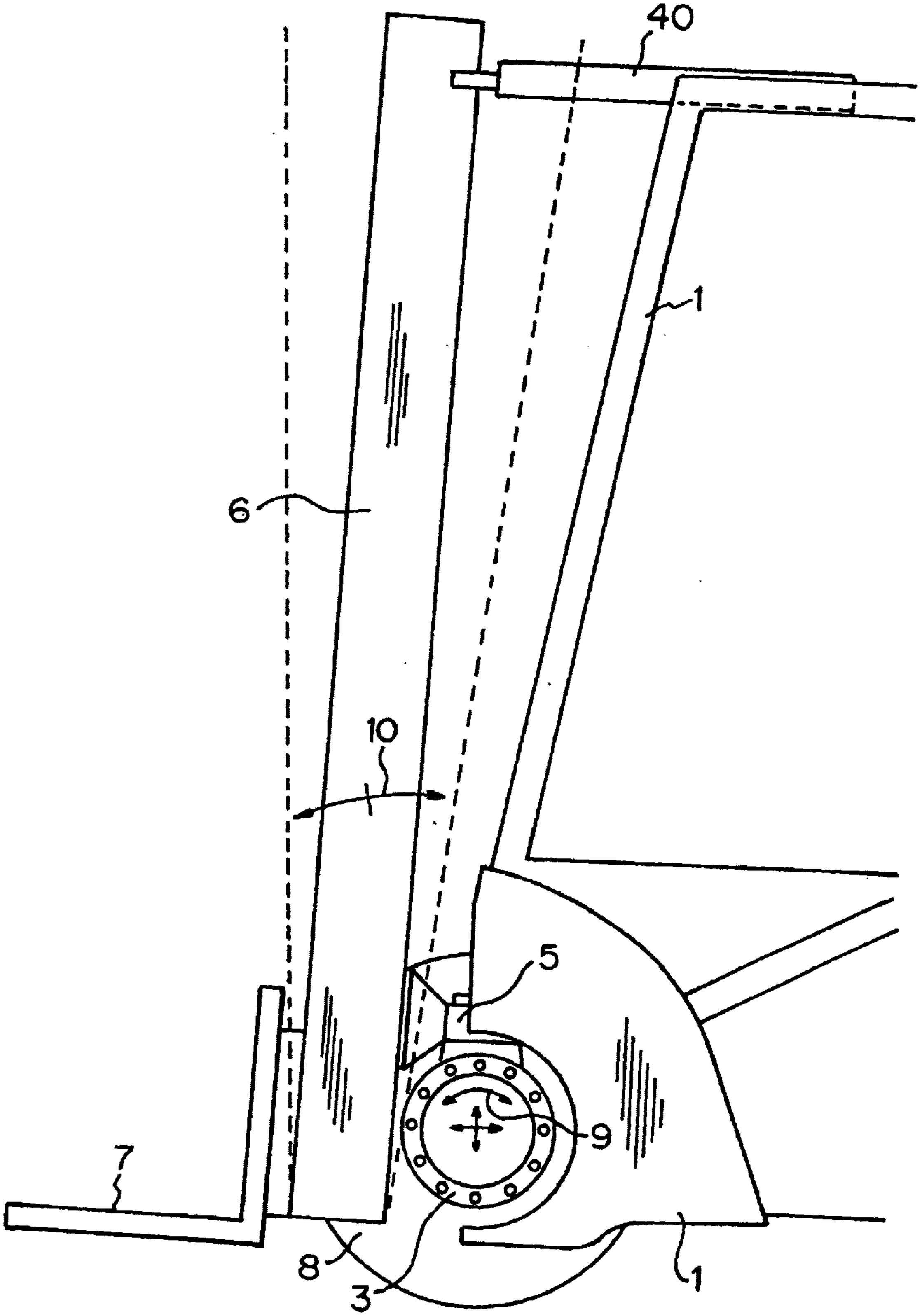
FIG. 5 is a side view of the truck of FIG. 1 showing the location of a support element in the form of a tilting cylinder.

FIG. 5 shows the arrangement of a support element 40 in the form of a tilting cylinder which can be used to generate the force to tilt the lifting mechanism 6 in the direction of arrow 10. The support element 40, e.g., tilting cylinder, is connected on one end with the lifting mechanism 6 and on the other end with the vehicle frame 1. In this exemplary embodiment, the vehicle frame 1 simultaneously forms the driver's cab of the fork lift truck. The support element 40 additionally forms a torque support for the axle body 3 of the fork lift truck. The moments acting in the direction of the arrow 9 during travel of the fork lift truck, e.g., during acceleration or deceleration processes, are thereby supported on the vehicle frame 1 via the lifting mechanism 6 and the support element 40. There is no need for a conventional torque support in the form of an additional component.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A fork lift truck, comprising:

a vehicle frame;

a lifting mechanism connected to the frame;

at least one axle clamp connected to the vehicle frame;

a front axle having an axle body; and at least one elastic bearing comprising at least one elastic damping element located between the axle body and each axle clamp, wherein the lifting mechanism is connected with the axle body by a rigid connecting element.

2. The fork lift truck as claimed in claim 1, wherein the lifting mechanism can be tilted with the axle body relative to the vehicle frame.

3. The fork lift truck as claimed in claim 2, wherein the elastic bearing is configured such that relative movement that takes place in the event of a tilting of the lifting mechanism between the axle body and the vehicle frame is equalized by the elastic bearing.

4. The fork lift truck as claimed in claim 1, wherein each elastic bearing includes a plurality of elastic damping elements.

5. The fork lift truck as claimed in claim 1, including at least one drive unit for traction operation of the fork lift truck fastened to the axle body.

6. The fork lift truck as claimed in claim 1, wherein front wheels of the fork lift truck are mounted on the axle body.

7. The fork lift truck as claimed in claim 1, wherein the lifting mechanism is connected to the axle body at at least two positions.

8. The fork lift truck as claimed in claim 1, wherein the axle body is formed by a tubular component.

9. The fork lift truck as claimed in claim 1, wherein the axle body is made at least partly of gray cast iron.

10. The fork lift truck as claimed in claim 4, wherein the elastic damping elements are elastomeric damping elements.

11. The fork lift truck as claimed in claim 3, wherein each elastic bearing includes at least one elastomeric damping element.

12. The fork lift truck as claimed in claim 2, wherein the axle body is formed by a tubular component.

* * * * *